United States Patent
Fang (10) Patent No.: US 9,888,234 B2
(45) Date of Patent: Feb. 6, 2018

(54) THREE-DIMENSIONAL INTERGAL IMAGING DISPLAY DEVICE AND DISPLAY SYSTEM

(71) Applicant: SHENZHEN CHINA STAR OPTOELECTRONICS TECHNOLOGY CO., LTD., Shenzen, Guangdong (CN)

(72) Inventor: Bin Fang, Shenzhen (CN)

(73) Assignee: SHENZHEN CHINA STAR OPTOELECTRONICS TECHNOLOGY CO., LTD., Shenzen, Guangdong (CN)

( * ) Notice: Subject to any disclaimer, the term of this patent is extended or adjusted under 35 U.S.C. 154(b) by 465 days.

(21) Appl. No.: 14/416,207

(22) PCT Filed: Oct. 17, 2014

(86) PCT No.: PCT/CN2014/088820
§ 371 (c)(1),
(2) Date: Jan. 21, 2015

(87) PCT Pub. No.: WO2016/054836
PCT Pub. Date: Apr. 14, 2016

(65) Prior Publication Data
US 2016/0105668 A1    Apr. 14, 2016

(30) Foreign Application Priority Data
Oct. 9, 2014 (CN) .......................... 2014 1 0528361

(51) Int. Cl.
*G02F 1/1335* (2006.01)
*H04N 13/04* (2006.01)
(Continued)

(52) U.S. Cl.
CPC ..... *H04N 13/0497* (2013.01); *G02B 27/0075* (2013.01); *G02B 27/2207* (2013.01); *G02F 1/133526* (2013.01); *G02F 1/133553* (2013.01); *G02F 1/133602* (2013.01); *H04N 13/0022* (2013.01); *H04N 13/0232* (2013.01); *H04N 13/0242* (2013.01); *H04N 13/0406* (2013.01); *H04N 13/0418* (2013.01)

(58) Field of Classification Search
CPC .......... G02F 1/133526; H04N 13/0404; H04N 13/0232; H04N 13/0406
USPC ........................................ 349/15, 95; 348/54
See application file for complete search history.

(56) References Cited

U.S. PATENT DOCUMENTS

2008/0186573 A1* 8/2008 Lipton ................. G02B 3/0012
359/463

OTHER PUBLICATIONS

Wang et al., "Research on Enhancement Methods for Depth of Field of Three-dimensional Integral Imaging", Aug. 2009, five pages total.

* cited by examiner

*Primary Examiner* — Thanh-Nhan P Nguyen
(74) *Attorney, Agent, or Firm* — Sughrue Mion, PLLC (57) ABSTRACT

A three-dimensional integral imaging display device and a display system are provided, the three-dimensional integral imaging display device has: a two-dimensional liquid crystal display panel, a lens array, and an adjustment means, which is disposed between the two-dimensional liquid crystal display panel and the lens array, for increasing a depth of field of the three-dimensional integral imaging display device. The three-dimensional integral imaging display device can increase the depth of field of the display device.

17 Claims, 3 Drawing Sheets

(51) Int. Cl.
*H04N 13/00* (2006.01)
*H04N 13/02* (2006.01)
*G02B 27/00* (2006.01)
*G02B 27/22* (2006.01)

THREE-DIMENSIONAL INTERGAL IMAGING DISPLAY DEVICE AND DISPLAY SYSTEM

FIELD OF THE INVENTION

The present invention relates to the technical field of liquid crystals, and in particular to a three-dimensional integral imaging display device and display system.

BACKGROUND OF THE INVENTION

Integrated imaging has become a research hotspot in the naked eye 3D display field, since it has the advantages of being capable of displaying real-time 3D stereoscopic images with full true color, full-parallax, and so on. The basic principle is using a micro lens array to record the spatial scene to a plastic sheet behind the micro lens array, each micro lens corresponds to an image element on the plastic sheet therebehind, each of the image elements records a part of the spatial scene information, all the image elements constitute an image element array and records a three-dimensional information of the entire spatial scene. According to the principle of reversibility of a light path, if a micro lens array which is the same as the one being used during the recording is placed in front of the image element array, an original three-dimensional spatial scene can be reconstructed in front of the micro lens array.

Since when the light converges (or the reverse of convergent extension), a depth of field of the lens will not be big enough, and a reconstructed image size will be larger than that of an actual object; if textures of the object are more complex, the reconstructed image will appear blurred. Therefore, in the integrated imaging, the depth of field needs to be increased, and since the conventional method to increase the depth of field is achieved by reducing a lens pitch between the lenses, which requires increasing the number of lenses, the production costs are higher, and the implementation process is more complicated.

Thus, it is necessary to provide a three-dimensional integral imaging display device and display system to solve the problems in the conventional art.

SUMMARY OF THE INVENTION

The objective of the present invention is to provide a three-dimensional integral imaging display device and display system, in order to solve the technical problems such as high production costs and complex implementation process when a depth of field is increased in conventional arts.

In order to solve the above problems, the present invention constructs a three-dimensional integral imaging display device, comprising:

A two-dimensional liquid crystal display panel having an image display plane, comprising a plurality of display element images, for displaying three-dimensional scene information from different angles, the display element image comprises a plurality of display pixels; a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passes through a plane of an optical center of the lens, the lens array has a light incident side near a side of the two-dimensional liquid crystal display panel, the display element image is projected onto the light incident side of the lens array, so as to form a light spot; and an adjustment means, disposed between the two-dimensional liquid crystal display panel and the lens array, for increasing a depth of field of the three-dimensional integral imaging display device by reducing a size of the light spot; wherein the adjustment means is a vertical grating which has a plurality of holes on a cross-section parallel to the image display plane, the holes of the vertical grating have a predetermined depth on a cross-section vertical to the image display plane, each hole corresponds to each one of the display pixels, a size of each hole is less than or equal to a size of the display pixel.

In the three-dimensional integral imaging display device of the present invention, the size of each hole is equal to that of the display pixel, and an edge of each hole is aligned with an edge of the display pixel.

In the three-dimensional integral imaging display device of the present invention, the predetermined depth is less than or equal to the predetermined distance.

In the three-dimensional integral imaging display device of the present invention, a surface of the vertical grating is coated with a light-reflecting layer.

In the three-dimensional integral imaging display device of the present invention, the three-dimensional integrated image display device further comprises a backlight module for providing backlight, the backlight module is a directional back light module.

The present invention constructs a three-dimensional integral imaging display device, comprising:

A two-dimensional liquid crystal display panel having an image display plane, comprising a plurality of display element images, for displaying three-dimensional scene information from different angles, the display element image comprises a plurality of display pixels; a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passes through a plane of an optical center of the lens; and an adjustment means, disposed between the two-dimensional liquid crystal display panel and the lens array, for increasing a depth of field of the three-dimensional integral imaging display device.

In the three-dimensional integral imaging display device of the present invention, the lens array has a light incident side near a side of the two-dimensional liquid crystal display panel, the display element image is projected onto the light incident side of the lens array, so as to form a light spot; the adjustment means increases the depth of field of the three-dimensional integral imaging display device by reducing a size of the light spot.

In the three-dimensional integral imaging display device of the present invention, the adjustment means is a vertical grating, which has a plurality of holes on a cross-section parallel to the image display plane, the holes of the vertical grating have a predetermined depth on a cross-section vertical to the image display plane, each hole corresponds to each one of the display pixels, a size of each hole is less than or equal to a size of the display pixel.

In the three-dimensional integral imaging display device of the present invention, the size of each hole is equal to the size of the display pixel, and an edge of the hole is aligned with an edge of the display pixel.

In the three-dimensional integral imaging display device of the present invention, the predetermined depth is less than or equal to the predetermined distance.

In the three-dimensional integral imaging display device of the present invention, a surface of the vertical grating is coated with a light-reflecting layer.

In the three-dimensional integral imaging display device of the present invention, the three-dimensional integrated image display device further comprises a backlight module for providing backlight, the backlight module is a directional back light module.

Another objective of the present invention is to provide a three-dimensional integral imaging display system, comprising:

A three-dimensional integral imaging acquisition device, comprising: an image acquisition sensor comprising a plurality of acquisition units for gathering three-dimensional scene information from different angles; and a collecting lens array for converting a three-dimensional image of a three-dimensional scene into a three-dimensional scene information from different angles.

And a three-dimensional integral imaging display device, comprising: a two-dimensional liquid crystal display panel having an image display plane, including a plurality of display element images for displaying three-dimensional scene information from different angles, the display element image comprises a plurality of display pixels; a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passing through a plane of an optical center of the lens; and an adjustment means, disposed between the two-dimensional liquid crystal display panel and the lens array, for increasing a depth of field of the three-dimensional integral imaging display device.

In the three-dimensional integral imaging display system of the present invention, the lens array has a light incident side near a side of the two-dimensional liquid crystal display panel, the display element image is projected onto the light incident side of the lens array, so as to form a light spot; the adjustment means increases the depth of field of the three-dimensional integral imaging display device by reducing a size of the light spot.

In the three-dimensional integral imaging display system of the present invention, the adjustment means is a vertical grating which has a plurality of holes on a cross-section parallel to the image display plane, the holes of the vertical grating have a predetermined depth on a cross-section vertical to the image display plane, each of the holes is corresponding to each of the display pixels, a size of each hole is less than or equal to a size of the display pixel.

In the three-dimensional integral imaging display system of the present invention, the size of each hole is equal to the size of the display pixel, and an edge of each hole is aligned with an edge of the display pixel.

In the three-dimensional integral imaging display system of the present invention, the predetermined depth is less than or equal to the predetermined distance.

In the three-dimensional integral imaging display system of the present invention, a surface of the vertical grating is coated with a light-reflecting layer.

In the three-dimensional integral imaging display system of the present invention, the three-dimensional integrated image display device further comprises a backlight module for providing backlight, the backlight module is a directional back light module.

The three-dimensional integral imaging display device and display system of the present invention increases the depth of field by disposing the vertical grating having holes between the two-dimensional liquid crystal display panel and the lens array, thereby improved the naked eye 3D display effect, and increased the resolution of the display device and a display system, the technical problems such as high production costs and the complex implementation process of the conventional art are therefore solved.

DETAILED DESCRIPTION OF THE PREFERRED EMBODIMENTS

The following descriptions of the respective embodiments are specific embodiments capable of being implemented as illustrations of the present invention, with reference to the appended figures. The terms up, down, front, rear, left, right, interior, exterior, side, etcetera are merely directions referring to the appended figures. Therefore, such directions are employed for explaining and understanding the present invention, but are not limitations thereto.

Figure 1:
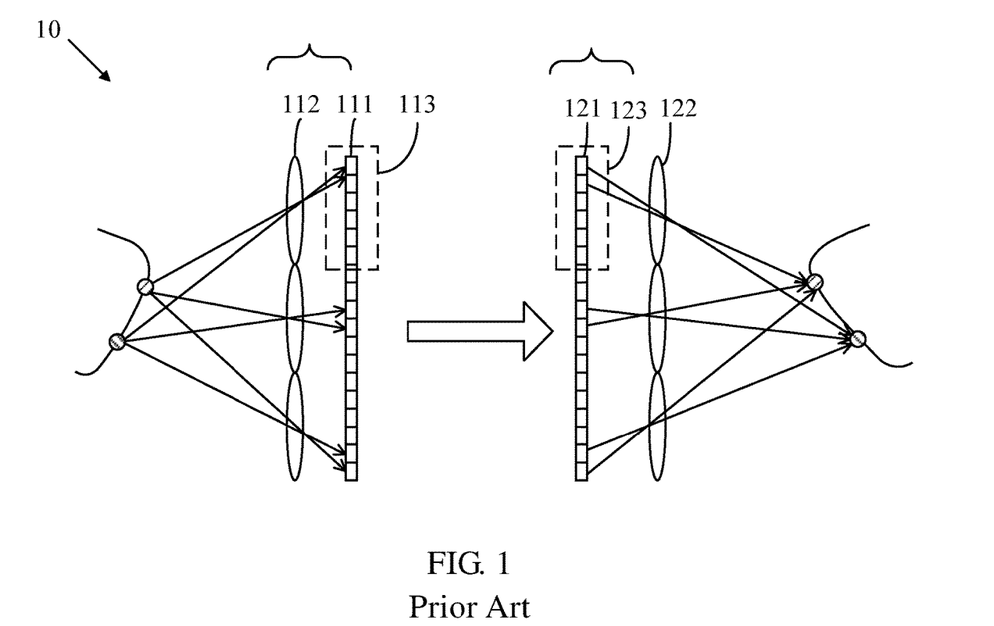
FIG. 1 is a schematic diagram of a conventional three-dimensional integral imaging display system.

Please refer to FIG. 1, which is schematic diagram of a conventional three-dimensional integral imaging display system.

The three-dimensional integral imaging display system 10 comprises a three-dimensional integral imaging acquisition device 11 and a three-dimensional integral imaging display device 12, the three-dimensional integral imaging acquisition device 11 comprises an image acquisition sensor 111 and a lens array 112, the image acquisition sensor 111 includes a plurality of acquisition units for gathering three-dimensional scene information from different angles, the lens array 112 is for converting a three-dimensional image of the three-dimensional scene into the three-dimensional scene information from different angles.

The three-dimensional integral imaging display device 12 comprises a two-dimensional liquid crystal display panel 121 and a lens array 122, the two-dimensional liquid crystal display panel 121 comprises a plurality of display element images 123 for displaying three-dimensional scene information from different angles, the lens array 122 is for synthesizing the three-dimensional scene information displayed by the corresponding display element image to a three-dimensional image of the three-dimensional scene.

Each of the acquisition units 113 of the image acquisition sensor 111 corresponds to each lens of the lens array 112, each of the acquisition units 113 of the image acquisition sensor 111 corresponds to each of the display element images 123 of the two-dimensional liquid crystal display panel 121.

Figure 2:
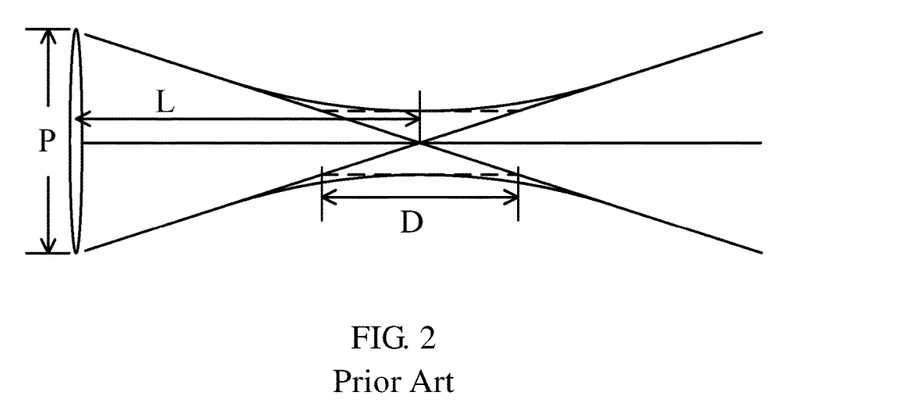
FIG. 2 is a schematic diagram of a depth of the field of a conventional three-dimensional integral imaging display device.

Each of the display element images 123 of the two-dimensional liquid crystal display panel 121 corresponds to each lens of the lens array 122. A depth of field of the three-dimensional integral imaging display device 12 is shown as D in FIG. 2, where p is a lens pitch of the lens, L is a distance between an optical center and a focus of the lens, and λ is a wavelength of infrared light. The depth of field is calculated as:

$$D = 4\lambda \left(\frac{L}{P}\right)^2 \quad (1)$$

Since when the light converges (or the reverse of convergent extension), the depth of field of the three-dimensional integral imaging display device 12 is not big enough, which makes a size of a three dimensional image synthesized by the lens array 122 to be larger than that of an actual object, if textures of the actual object are more complex, the three dimensional image synthesized by the lens array 122 will appear blurred, therefore, in the integrated imaging, the depth of field needs to be increased. As shown in Equation 2, to increase the depth of field, it is necessary to reduce the lens pitch between the lenses, that is using lenses with a smaller lens pitch, in order to ensure that each of the display element images 123 of the two-dimensional liquid crystal display panel 121 corresponds to each lens of the lens array 122; when the lens pitch is smaller, the number of lenses in the lens array increases, resulting in an increase of production costs.

Figure 3:
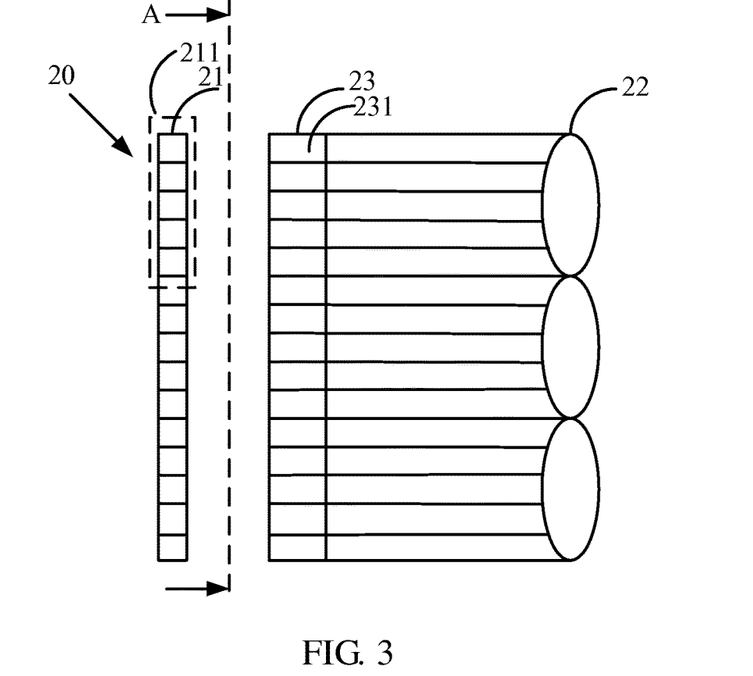
FIG. 3 is a schematic diagram of a three-dimensional integral imaging display device of the present invention.

Refer to FIG. 3, which is a schematic diagram of a three-dimensional integral imaging display device of the present invention.

As shown in FIG. 3, the three-dimensional integral imaging display device 20 of the present invention comprises a two-dimensional liquid crystal display panel 21 having an image display plane, and a lens array 22. The two-dimensional liquid crystal display panel comprises a plurality of display element images 211 for displaying three-dimensional scene information from different angles, the display element image comprises a plurality of display pixels, and the lens array 22 is for synthesizing the three-dimensional scene information displayed by the corresponding display element image 211 to a three-dimensional image of the three-dimensional scene.

Each lens of the lens array 21 corresponds to each of the display element images 211, the image display plane is disposed and parallel to a first plane, the image display plane and the first surface have a predetermined distance therebetween, the predetermined distance is greater than or less than a focus of the lens array, the first plane is vertical to a main optical axis of a lens of the lens array 22 and passes through a plane of an optical center of the lens; and the three-dimensional integral imaging display device 20 of the present invention further comprises an adjustment means, which is disposed between the two-dimensional liquid crystal display panel 21 and the lens array 22 for increasing a depth of field of the three-dimensional integral imaging display device 20.

Figure 4:
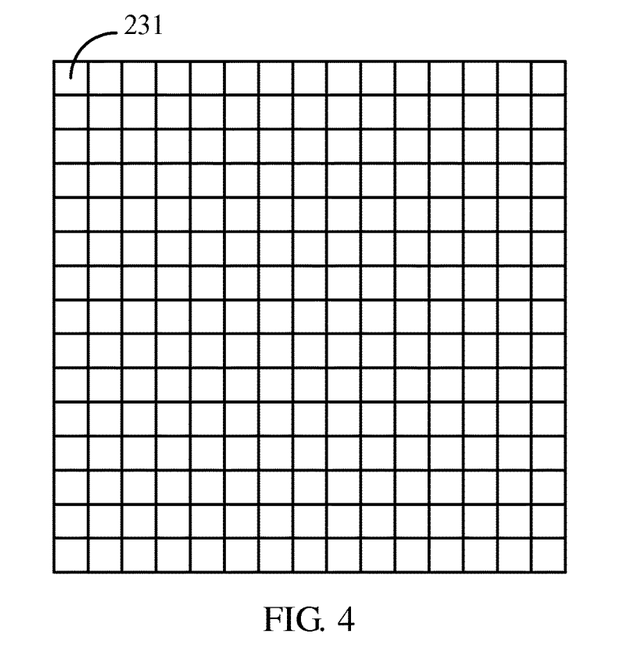
FIG. 4 is a schematic diagram of a cross-sectional view of a vertical grating along the A-A' direction shown in FIG. 3.

The adjustment means, for example, is a vertical grating 23, as shown in FIG. 4, which is a schematic diagram of a cross-sectional view of a vertical grating along the A-A' direction shown in FIG. 3; wherein the A-A' direction is parallel to the image display plane. The vertical grating 23 has a plurality of holes 231. On the cross-section vertical to the image display plane (in conjunction with FIG. 3), the holes 231 of the vertical grating 23 have a predetermined depth in a direction vertical to the image display plane; in a direction vertical to the image display plane, each of the holes 231 corresponds to each of the display pixels. A size of the hole 231 is less than or equal to a size of the display pixel.

The lens array 22 has a light incident side near a side of the two-dimensional liquid crystal display panel 21. The display element image 211 is projected onto the light incident side of the lens array 22, so as to form a light spot. The adjustment means increases the depth of field of the three-dimensional integral imaging display device by reducing a size of the light spot.

Figure 5:
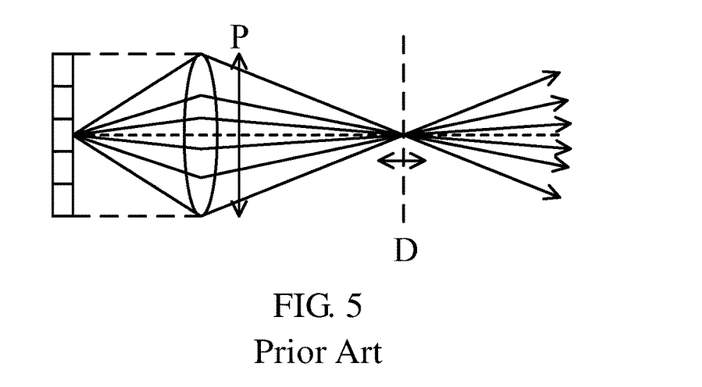
FIG. 5 is a schematic diagram of a light spots formation of the conventional art.

Taking a single lens in the lens array 22 for example, a light spot formation of the conventional art is shown in FIG. 5. When the display element image is projected onto the light incident side of the lens array 22, since the light is not sheltered, the light spot occupies the entire lens.

Figure 6:
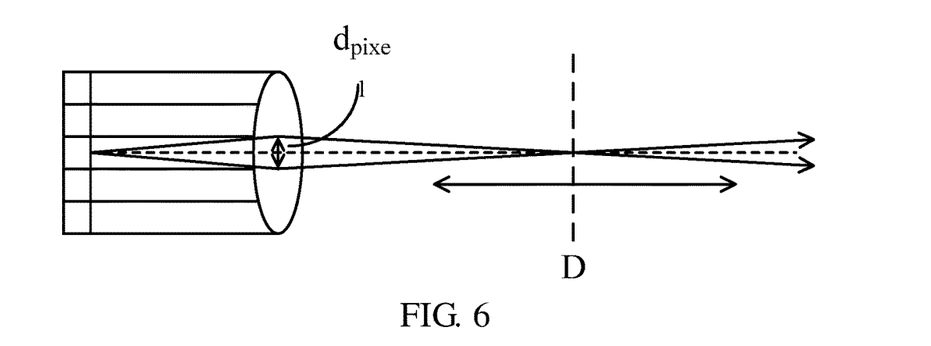
FIG. 6 is a schematic diagram of a light spots formation in a three-dimensional integral imaging display device of the present invention.

As shown in FIG. 6, the display element image 211 of the present invention passes through the vertical grating 23, and is then projected onto the light incident side of the lens array 22. Since a part of the light is blocked by the vertical grating 23, and the size of the hole 231 is less than or equal to the size of the display pixel, a forming area of a largest spot is the same as that of the display pixel. Thus, in equation (1) the lens pitch p between the lenses is equivalent to dpixel, and the depth of field is calculated as equation (2), where D is the depth of field of the three-dimensional integral imaging display device 20, and L is a distance between the optical center and the lens focus:

$$D = 4\lambda \left(\frac{L}{d_{pixel}}\right)^2 \quad (2)$$

That is, since dpixel is smaller than the lens pitch P, the P in equation (1) is reduced, and therefore the depth of field increases.

For example, if N light spots are formed on the incident side of the lens, then the depth of field of the three-dimensional integral imaging display device 20 is $N^2$ times of that of a conventional device.

Preferably, the size of the hole 231 is equal to that of the display pixel, an edge of the hole 231 is aligned with an edge of the display pixel, and a shape of the hole 231 is matching to that of the display pixel. In this case, the display pixel can be completely synthesized, so that the three-dimensional image of the three-dimensional integral imaging display device 20 has better color saturation and a better display effect.

Preferably, the vertical grating 23 and the two-dimensional liquid crystal display panel 21 have a gap therebetween, or the vertical grating 23 and the lens array 22 have a gap therebetween, or the two-dimensional display panel 21 and the lens array 22 have a gap therebetween, the predetermine depth of the hole 231 is smaller than the predetermined distance, or the vertical grating 23 is simultaneously close to the two-dimensional liquid crystal display panel 21 and the lens array 22, so long as it is ensured that all light rays emitted by one pixel passing through the vertical grating 23 are able to be projected onto the same lens of the lens array 22.

Preferably, in order to avoid crosstalk between adjacent display pixels, the vertical grating 23 is made of opaque material, so as to obtain a better display effect.

Preferably, in order to improve the utilization of the backlight source, a light-reflecting layer (for example, a metal layer, such as silver) may be coated on a surface of the vertical grating 23. Since the brightness of the three-dimensional integral imaging display device is reduced due to the blocking of the vertical grating by using the light-reflection layer, a part of the shielded light is able to be refracted onto the lens array, and thus weaken the brightness impact of the vertical grating 23 on the three-dimensional integral imaging display device.

Figure 7:
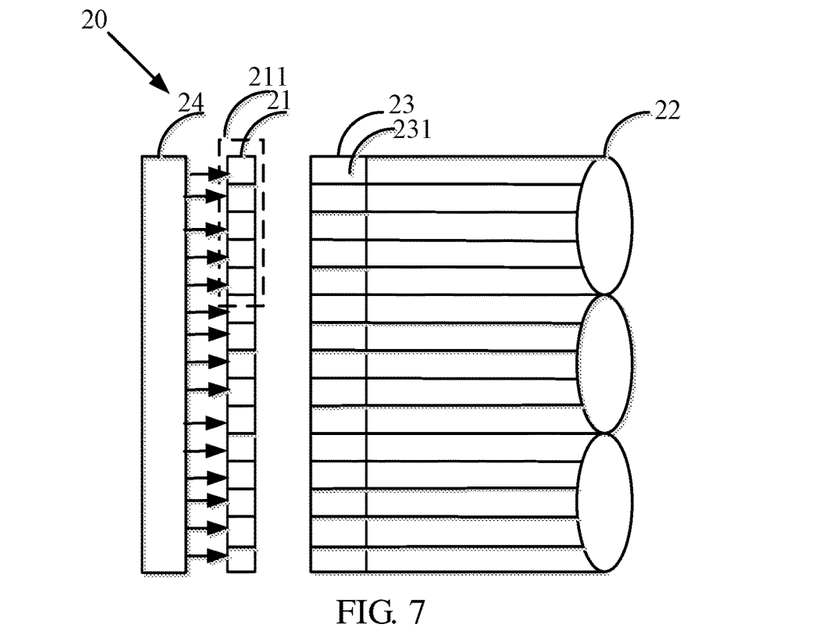
FIG. 7 is a schematic diagram of a three-dimensional integral imaging display device according to one preferred embodiment of the present invention.

Preferably, as shown in FIG. 7, the three-dimensional integral imaging display device 20 further comprises a backlight module 24 for providing backlight, and the backlight module 24 is a directional back light module. Since the directional backlight module can control the direction of emitted light, although the vertical grating blocks the light when the light of the directional backlight module 24 is emitted from the middle of the display pixels, in particular when the edge of the display pixel is aligned with the edge of the holes 231, the light in the middle of the holes will not be blocked by the vertical grating 23, and thus the utilization of the backlight source is effectively improved, and the brightness of the three-dimensional integral imaging display device is increased.

The three-dimensional integral imaging display device of the present invention increases the depth of field by disposing the vertical grating having holes between the two-dimensional liquid crystal display panel and the lens array, thereby improved the naked eye 3D display effect, and increasing the resolution of the display device. The technical problems such as high production costs and the complex implementation process of the conventional three-dimensional integral imaging display device are therefore solved.

The present invention further provides a three-dimensional integral imaging display system, comprising: a three-dimensional integral imaging acquisition device and a three-dimensional integral imaging display device.

The three-dimensional integral imaging acquisition device comprises: an image acquisition sensor and a collecting lens array, the image acquisition sensor includes a plurality of acquisition units for gathering three-dimensional scene information from different angles; the collecting lens array is for conversing a three-dimensional image of the three-dimensional scene into the three-dimensional scene information from different angles.

The three-dimensional integral imaging display device comprises a two-dimensional liquid crystal display panel having an image display plane, and a lens array, the two-dimensional liquid crystal display panel comprises a plurality of display element images for displaying three-dimensional scene information from different angles. The display element image comprises a plurality of display pixels; the lens array is for synthesizing the three-dimensional scene information displayed by the corresponding display element image to a three-dimensional image of the three-dimensional scene, wherein each lens of the lens array corresponds to each of the display element images. The image display plane is disposed and parallel to a first plane; the image display plane and the first surface have a predetermined distance therebetween, and the first plane is vertical to a main optical axis of a lens of the lens array and passes through a plane of an optical center of the lens.

And the three-dimensional integral imaging display of the present invention further comprises an adjustment means, which is disposed between the two-dimensional liquid crystal display panel and the lens array, for increasing a depth of field of the three-dimensional integral imaging display device.

The three-dimensional integral imaging acquisition device in the three-dimensional integral imaging acquisition system of the present invention may be any of the three-dimensional integral imaging acquisition devices in above-described embodiments, in view of the three-dimensional integral imaging acquisition device having been described above in detail, it will not be repeated herein.

The three-dimensional integral imaging display system of the present invention increases the depth of field by disposing the vertical grating having holes between the two-dimensional liquid crystal display panel and the lens array, thereby improving the naked eye 3D display effect, and increasing the resolution of the display device. The technical problems such as high production costs and the complex implementation process of the conventional three-dimensional integral imaging display system are therefore solved.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present invention is defined by the appended claims rather than the foregoing description and the exemplary embodiments described therein.

What is claimed is:

1. A three-dimensional integral imaging display device, comprising:
   a two-dimensional liquid crystal display panel having an image display plane, comprising: a plurality of display element images, for displaying three-dimensional scene information from different angles, the display element image comprising a plurality of display pixels;
   a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passes through a plane of an optical center of the lens, the lens array has a light incident side near a side of the two-dimensional liquid crystal display panel, the display element image is projected onto the light incident side of the lens array, so as to form a light spot; and
   an adjustment means, disposed between the two-dimensional liquid crystal display panel and the lens array, for increasing a depth of field of the three-dimensional integral imaging display device by reducing a size of the light spot; wherein the adjustment means is a vertical grating, which has a plurality of holes on a cross-section parallel to the image display plane, the hole of the vertical grating has a predetermined depth on a cross-section vertical to the image display plane, each hole corresponds to each one of the display pixels, a size of each hole is less than or equal to a size of the display pixel.

2. The three-dimensional integral imaging display device as claimed in claim 1, wherein the size of each hole is equal to the size of the display pixel, and an edge of each hole is aligned with an edge of the display pixel.

3. The three-dimensional integral imaging display device as claimed in claim 1, wherein the predetermined depth is less than or equal to the predetermined distance.

4. The three-dimensional integral imaging display device as claimed in claim 1, wherein a surface of the vertical grating is coated with a light-reflecting layer.

5. The three-dimensional integral imaging display device as claimed in claim 1, wherein the three-dimensional integrated image display device further comprises a backlight module for providing backlight, the backlight module is a directional back light module.

6. A three-dimensional integral imaging display device, comprising:
a two-dimensional liquid crystal display panel having an image display plane, comprising: a plurality of display element images, for displaying three-dimensional scene information from different angles, the display element image comprising a plurality of display pixels;
a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passes through a plane of an optical center of the lens, and
an adjustment means, disposed between the two-dimensional liquid crystal display panel and the lens array, for increasing a depth of field of the three-dimensional integral imaging display device;
wherein the adjustment means is a vertical grating, which has a plurality of holes on a cross-section parallel to the image display plane, the holes of the vertical grating have a predetermined depth on a cross-section vertical to the image display plane, each hole corresponds to each one of the display pixels, a size of each hole is less than or equal to a size of the display pixel.

7. The three-dimensional integral imaging display device as claimed in claim 6, wherein the lens array has a light incident side near a side of the two-dimensional liquid crystal display panel, the display element image is projected onto the light incident side of the lens array, so as to form a light spot, the adjustment means increases the depth of field of the three-dimensional integral imaging display device by reducing a size of the light spot.

8. The three-dimensional integral imaging display device as claimed in claim 6, wherein the size of each hole is equal to the size of the display pixel, and an edge of each hole is aligned with an edge of the display pixel.

9. The three-dimensional integral imaging display device as claimed in claim 6, wherein the predetermined depth is less than or equal to the predetermined distance.

10. The three-dimensional integral imaging display device as claimed in claim 6, wherein a surface of the vertical grating is coated with a light-reflecting layer.

11. The three-dimensional integral imaging display device as claimed in claim 6, wherein the three-dimensional integrated image display device further comprises a backlight module for providing backlight, the backlight module is a directional back light module.

12. A three-dimensional integral imaging display system, comprising:
a three-dimensional integral imaging acquisition device, comprising:
an image acquisition sensor, including a plurality of acquisition units for gathering three-dimensional scene information from different angles; and
a collecting lens array for converting a three-dimensional image of a three-dimensional scene into the three-dimensional scene information from different angles; and
a three-dimensional integral imaging display device, comprising:
a two-dimensional liquid crystal display panel having an image display plane, comprising: a plurality of display element images, for displaying three-dimensional scene information from different angles, the display element image comprising a plurality of display pixels;
a lens array for synthesizing the three-dimensional scene information displayed by the corresponding display element image to a three-dimensional image of the three-dimensional scene, wherein each lens of the lens array corresponds to each of the display element images, the image display plane is disposed and parallel to a first plane, the image display plane and the first surface have a predetermined distance therebetween, the first plane is vertical to a main optical axis of a lens of the lens array and passes through a plane of an optical center of the lens; and
an adjustment means, disposed between the two-dimensional liquid crystal display panel and the lens array, for increasing a depth of field of the three-dimensional integral imaging display device;
wherein the adjustment means is a vertical grating, which has a plurality of holes on a cross-section parallel to the image display plane, the holes of the vertical grating have a predetermined depth on a cross-section vertical to the image display plane, each holes corresponds to each one of the display pixels, a size of each hole is less than or equal to a size of the display pixel.

13. The three-dimensional integral imaging display system as claimed in claim 12, wherein the lens array has a light incident side near a side of the two-dimensional liquid crystal display panel, the display element image is projected onto the light incident side of the lens array, so as to form a light spot, the adjustment means increases the depth of field of the three-dimensional integral imaging display device by reducing a size of the light spot.

14. The three-dimensional integral imaging display system as claimed in claim 12, wherein the size of each hole is equal to the size of the display pixel, and an edge of each hole is aligned with an edge of the display pixel.

15. The three-dimensional integral imaging display system as claimed in claim 12, wherein the predetermined depth is less than or equal to the predetermined distance.

16. The three-dimensional integral imaging display system as claimed in claim 12, wherein a surface of the vertical grating is coated with a light-reflecting layer.

17. The three-dimensional integral imaging display system as claimed in claim 12, wherein the three-dimensional integrated image display device further comprises a backlight module for providing backlight, the backlight module is a directional back light module.

\* \* \* \* \*